United States Patent [19]
Jockel et al.

[11] 3,988,425
[45] Oct. 26, 1976

[54] PROCESS OF PRODUCING CARBON MONOXIDE FROM LIGHT HYDROCARBONS

[75] Inventors: Heinz Jockel, Klein-Gerau; Friedrich Wilhelm Möller, Seulberg; Hans Günter Mörtel, Frankfurt am Main; Heiner Tanz, Sprendlingen, all of Germany

[73] Assignee: Metallgesellschaft Aktiengesellschaft, Frankfurt am Main, Germany

[22] Filed: July 30, 1974

[21] Appl. No.: 493,203

[30] Foreign Application Priority Data
Aug. 16, 1973 Germany............................ 2341373

[52] U.S. Cl.............................. 423/415 A; 423/652; 423/653; 423/654
[51] Int. Cl.² ...................... C01B 31/00; C01B 1/18
[58] Field of Search ........... 423/415, 651, 652, 653, 423/654

[56] References Cited
UNITED STATES PATENTS

| | | | |
|---|---|---|---|
| 3,197,284 | 7/1965 | Hoekstra............................ | 423/651 |
| 3,264,066 | 8/1966 | Quartulli et al...................... | 423/654 |
| 3,379,505 | 4/1968 | Holmes et al........................ | 423/654 |
| 3,418,082 | 12/1968 | Ter Harr............................ | 423/652 |
| 3,457,192 | 7/1969 | Housset et al. ...................... | 423/654 |
| 3,515,514 | 6/1970 | Holmes et al....................... | 423/654 |
| 3,552,924 | 8/1966 | Hepp ................................. | 423/654 |
| 3,650,697 | 3/1972 | Goebel.............................. | 423/654 |
| 3,656,905 | 4/1972 | Smith et al......................... | 423/653 |
| 3,737,291 | 6/1973 | Lhonore et al...................... | 423/654 |
| 3,758,673 | 9/1973 | Buben et al........................ | 423/415 |
| 3,810,975 | 5/1974 | Brooke ............................. | 423/652 |
| 3,904,744 | 9/1975 | Pagel ............................... | 423/652 |

Primary Examiner—Earl C. Thomas
Assistant Examiner—Wayne A. Langel
Attorney, Agent, or Firm—Burgess, Dinklage & Sprung

[57] ABSTRACT

Carbon monoxide is produced from light hydrocarbons having an average C number not greater than 15 by catalytic cracking with water vapor in two cracking stages followed by separation of the carbon monoxide from the product gas employing the following steps:
i. mixing the hydrocarbon feedstock with 0.02–0.1 standard cubic meter hydrogen per kilogram;
ii. subjecting this mixture to hot desulfurization;
iii. mixing the desulfurized mixture with superheated process steam in a ratio of 1.1–1.7 moles per mole of carbon in the feedstock;
iv. converting the resulting mixture in contact with nickel catalysts in a first cracking stage at temperatures of 300°–500° C. and thereafter, after a partial pressure relief, in a second stage at temperatures above 825° C.; and
v. cooling the product gas which is rich in carbon monoxide and hydrogen, removing carbon dioxide and water vapor from the cooled product gas, and then decomposing said product gas at low temperatures recovering carbon monoxide and hydrogen.

5 Claims, 1 Drawing Figure

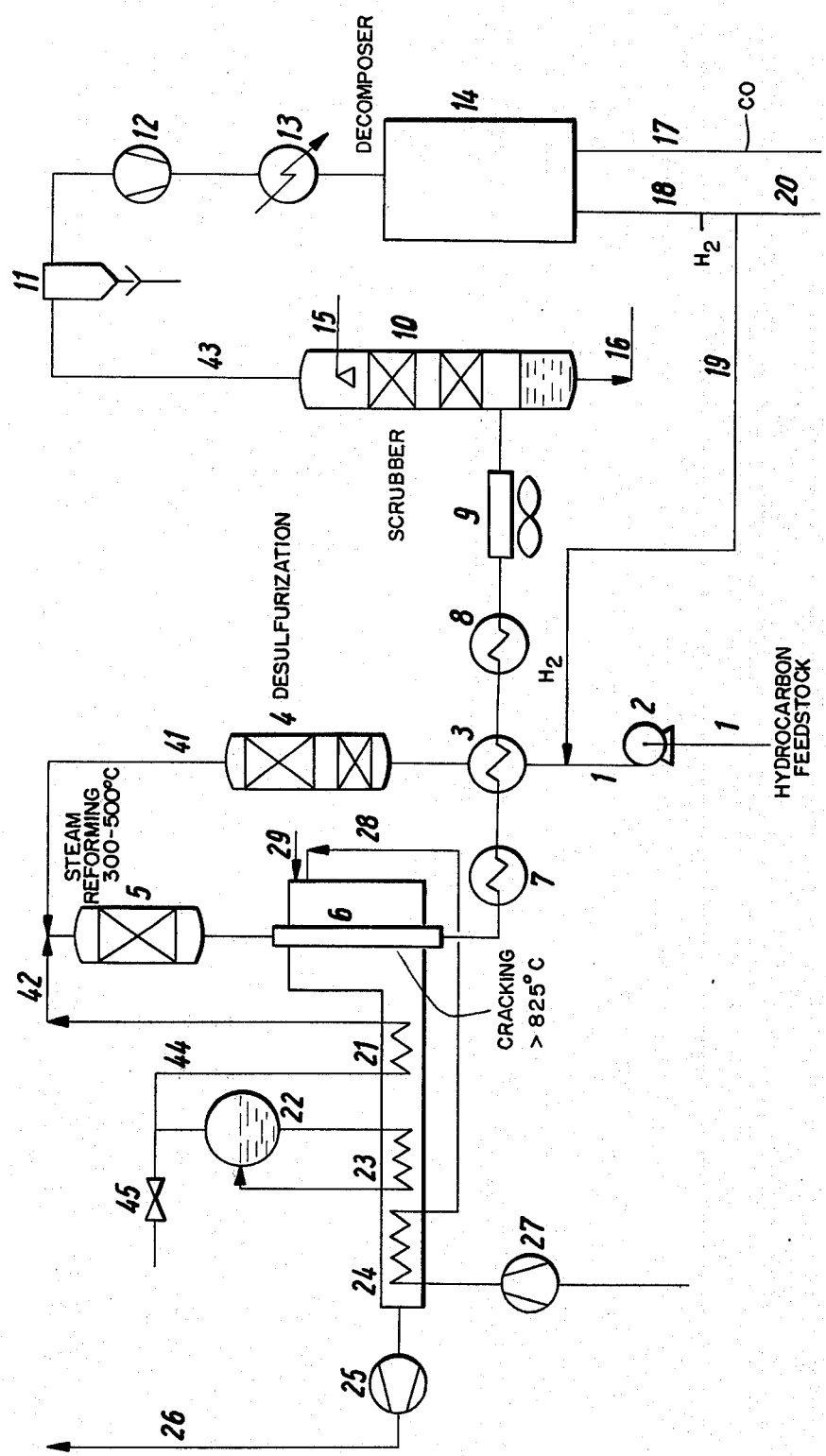

PROCESS OF PRODUCING CARBON MONOXIDE FROM LIGHT HYDROCARBONS

BACKGROUND

This invention relates to a process of producing carbon monoxide from light hydrocarbons having an average C number of not more than 15 by a catalytic cracking with water vapor in two cracking stages, followed by a separation of carbon monoxide from the product gas.

It is already known to produce carbon monoxide by a steam reforming process in which a feedstock such as natural gas, refinery gas, liquefied gas or naphtha is treated with water vapor at elevated temperatures in contact with a nickel catayst and is thus converted to a gas which is rich in hydrogen and carbon monoxide. When the product gas has been cooled down, the carbon dioxide and water vapor still contained therein are removed and the purified gas is decomposed at low temperature.

It is also known to improve the yield of carbon monoxide in that the carbon dioxide which has been scrubbed off is recycled to the cracking process (Printed Ger. application No. 1,913,657).

This recycling of the carbon dioxide imposes higher requirements as regards the materials of the equipment and the catalysts used in said process. The carbon dioxide which is obtained is saturated with water vapor and can be recycled only if a multistage recycling compressor is provided which has suitable interstage coolers of corrosion-resisting material. Besides, the catalytic cracking is performed in a tubular heater, in which the cracking conditions and the catalyst must be selected so as to prevent a deposition of carbon on the catalyst. Where a difficult feedstock, such as naphtha, is used, the direct conversion of the naphtha in a tubular heater in the presence of recycled carbon dioxide imposes extreme requirements as regards the catalysts which can be employed, and a large surplus of water vapor must be employed although this lowers the productivity.

Another disadvantage of the recycling of $CO_2$ is significant in practice and resides in the fact that the automatic control of the entire plant is more complicated because the carbon monoxide must be controlled too.

SUMMARY

The process according to the invention avoids the disadvantages involved in the state of the art and has an optimum economy as regards capital expenditure and operating expenses. This is accomplished in that the hydrocarbon feedstock is mixed with 0.02–0.1 standard cubic meter hydrogen per kilogram, the mixture is subjected to hot desulfurization, the desulfurized mixture is mixed with superheated process steam in a ratio of 1.1–1.7 moles per mole of carbon in the feedstock, the resulting mixture is converted in contact with nickel catalysts in a first cracking stage (rich gas stage) at temperature of 300°–500° C. and thereafter, after a partial pressure relief, in a second stage at temperatures above 825° C., and the product gas which is rich in carbon monoxide and hydrogen is cooled, carbon dioxide and water vapor are removed from the cooled product gas, and the latter is then decomposed at low temperatures. The process is much simpler than known processes because the number of feeding points for gaseous or vaporous reactants is decreased.

DESCRIPTION OF THE DRAWING

The present invention will be more fully understood from the following description taken in conjunction with the accompanying drawing which is a flow diagram illustrating a preferred embodiment for carrying out the process of the invention.

DESCRIPTION

The process uses a low ratio of about 2:1 of fed water vapor to hydrocarbon feedstock. The second cracking stage consists suitably of a tubular heater. The pressure relief before the second cracking stage ensures that there is no deposition of carbon black in that stage in spite of the relatively low water vapor content and that the $CO_2$ content of the product gas of the second cracking stage is minimized. The product gas from the second cracking stage contains only about 5% or less by volume $CO_2$ and only about 2% by volume of residual methane.

The rich gas stage may consist of two reactors, which are fed with respective portions of the feedstock whereas the second reactor is also fed with the product gas from the first reactor. In this case a lower ratio of water vapor to hydrocarbons may be used in the rich gas stage but in most cases water vapor will have to be added before the cracking tubular heater.

The catalyst for the rich gas stage comprises desirable 35–70% by weight nickel on a magnesium silicate or magnesium spinel support. The catalyst may be used in the cracking tubular heater although it is sufficient to use therein a catalyst consisting of 10–30% by weight of nickel on an alumina support.

An embodiment of the process according to the invention will be explained with reference to the drawing.

A hydrocarbon feedstock, such as naphtha, is fed by a pump 2 in a conduit 1 and through a heat exchanger 3, in which the feedstock is evaporated. 0.02–0.1 standard cubic meter hydrogen per kilogram of feedstock is admixed to the latter from conduit 19. The mixture is supplied at a temperature of about 350° C. and under a pressure of about 15 kilograms per square centimeter (absolute pressure) to the desulfurizing reactor 4, which is operated in known manner to convert in a first stage the sulfur compounds in contact with a hydrogenation catalyst to hydrogen sulfide, which is removed in a second bed of the reactor 4. The hydrogenating catalyst may contain, e.g., nickel or molybdenum, possibly in conjunction with cobalt. The absorbent for hydrogen sulfide may consist of zinc oxide or iron oxide (red mud).

The mixture of desulfurized hydrocarbons and water vapor leaves the reactor 4 at a temperature of about 350° C. and is fed through conduit 41 to a cracking reactor 5. Before the mixture enters the reactor, superheated process steam is admixed thereto from conduit 42 in a weight ratio of about 1.8:1 to 2.1:1 of steam to hydrocarbon. In the reactor 5, steam reforming is effected at temperatures of about 300° C–500° C., preferably 350°–460° C., to produce a high-methane gas. The pressure in the reactor 5 is 10–20 kilograms per square centimeter (absolute pressure).

After the catalytic rich gas stage (reactor 5), the process pressure is reduced to about 5–12 kilograms per square centimeter (absolute pressure). The pressure drop suitably amounts to 4–12 kilograms, preferably 5–8 kilograms, per square centimeter. This somewhat pressure-relieved rich gas is fed into a cracking tubular heater 6, where the cracking is continued at temperatures which are higher than in the reactor 5 so that the product gas leaves the heater at temperatures above 825° C. and preferably in the range of 850°–980° C. The cracking in the tubular heater 6 is effected in catalyst-filled tubes, which are heated from the outside by a large number of burners, which are arranged in the top and/or side walls of the heater and are supplied with fuel through conduit 29 and with preheated combustion air through conduit 28.

To utilize the sensible heat of the hot product gases from the cracking tubular heater 6, these product gases are fed first into a waste heat boiler 7 and then through the above-mentioned heat exchanger 3, which serves to evaporate gasoline, and through a feed water preheater 8. The gas is cooled further in a cooler 9 and is then fed to a scrubber 10, in which carbon dioxide is removed by scrubbing, e.g., with a monoet/hanolamine solution, which after regeneration is fed through conduit 15 to the scrubber 10 and when laden is withdrawn through conduit 16 and fed to a regenerating unit. The gas which leaves the scrubber 10 in conduit 43 contains residual carbon dioxide only in an amount of about 50–150 ppm by volume. This gas is passed through a separator 11, in which traces of liquid are removed, and through a multistage compressor 12, which compresses the gas to, e.g., 35 kilograms per square centimeter (absolute pressure). This is succeeded by a final cooling in a cooler 13 before the gas is fed to a known system 14 in which it is decomposed at low temperature of about −180° C. by condensation of carbon monoxide. This system may comprise an initial fine purification stage for a removal of traces of $CO_2$ and residual water vapor. The system 14 is operated, e.g., as a scrubber using liquid methane.

The system 14 delivers in conduit 17 the desired carbon monoxide in a purity of more than 99% by volume. The remaining impurities consist essentially of hydrogen and methane. The hydrogen gas also delivered by the system 14 in conduit 18 is partly recycled through conduit 19 to the hydrocarbon feedstock and the remainder is available in conduit 20 for any desired use.

The hot flue gases from the tubular heater 6 are at a temperature of about 975° C. or more. Their heat is first utilized in a process steam superheater 21 and then in a waste heat boiler 23. For a further utilization of the sensible heat of the flue gases these are also fed to a preheater 24 for combustion air. The preheater is supplied with air by a blower 27. The preheated combustion air is fed through conduit 28 to the tubular heater 6. At a temperature of about 150° C. the fuel gases are finally delivered by a blower 25 into a chimney 26.

From a steam drum 22 connected to the waste heat boiler 23, water vapor is supplied through a conduit 44 to the superheater 21. Surplus steam is discharged through a pressure valve 45 for further use. The waste heat boiler 7 is connected to the steam drum 22 by risers and downcomers, not shown, so that there is a natural circulation between the two units without need for a pump. The feed water supply means of the plant are not shown too. Water which has been heated at 8 is fed into the steam drum 22.

EXAMPLE 1000 kilograms gasoline per hour are mixed in conduit 1 with 60 standard cubic meters hydrogen gas per hour. The mixture is preheated to 350° C. in the heat exchanger 3 and desulfurized in the reactor 4. The desulfurized hot mixture of gasoline vapor and hydrogen is at a temperature of 350° C., and 2000 kilograms process steam at 450° C. are admixed to said mixture in conduit 41 so that a mixed temperature of 400° C. results.

The reactor 5 is a shaft reactor, in which the mixture is reacted in contact with a nickel catalyst, which contains 50% by weight nickel on a magnesium spinel support and has a large surface area. A high-methane gas is formed, which has the following composition in % by volume:

| | |
|---|---|
| $CO_2$ | 21.96 |
| CO | 0.45 |
| $H_2$ | 13.69 |
| $CH_4$ | 63.9 |

On a dry basis this gas also contains 0.92 standard cubic meters water vapor per standard cubic meter. The rich gas leaving the reactor 5 is at a temperature of 460° C. and under a pressure of 13 kilograms per square centimeter (absolute pressure). It is pressure-relieved to 8.5 kilograms per square centimeter (absolute pressure) and then fed to the cracking tubular heater 6, which is externally heated. The product gas from the heater 6 has the following composition in % by volume:

| | |
|---|---|
| $CO_2$ | 5.15 |
| CO | 25.10 |
| $H_2$ | 67.33 |
| $CH_4$ | 2.42 |

The gas also contains 0.16 standard cubic meter water vapor per standard cubic meter of dry gas.

When the gas has been cooled in 7, 3, 8, and 9, the $CO_2$ is removed in the scrubber 10 except for very small residues. After the removal of $CO_2$ the gas is passed through the separator 11 to remove traces of liquid and is then compressed in the compressor 12 to 35 kilograms per square centimeter (absolute pressure). Before entering the system 14 for decomposing the gas at low temperatures, the gas has the following composition:

| | |
|---|---|
| $CO_2$ | 50 ppm |
| CO | 26.46% by volume |
| $H_2$ | 70.99% by volume |
| $CH_4$ | 2.55% by volume. |

In the system 14 the gas is passed first through a fine purification plant, which comprises a molecular sieve and serves to remove traces of $CO_2$ and residual water vapor. The gas is subsequently decomposed at low temperatures, whereby 1190 standard cubic meters carbon monoxide having a purity of 99.8% by volume are recovered per hour and delivered in conduit 17. The impurities consist of 0.1% by volume $H_2$ and 0.1% by volume $CH_4$. Hydrogen gas composed of 99.0% by volume $H_2$ and 1.0% by volume $CH_4$ is also recovered at a rate of 3270 standard cubic meters per hour. To increase the hydrogen concentration,, the hydrogen gas is passed through a pressure swing adsorber so that the hydrogen in conduit 18 has a purity of 99.9% by volume.

The low-temperature decomposition of gas involving a scrubbing with liquid methane also results in by-products consisting of 83 standard cubic meters pure methane and 40 standard cubic meters flash gas per hour. The latter consists of about 45% hydrogen and about 55% carbon monoxide. Said residual quantities of methane and flash gas are used also to heat the cracking tubular heater 6.

What is claimed is:

1. Process for producing carbon monoxide from light hydrocarbon feedstock having an average C number not greater than 15 and containing sulfur impurities which comprises:
    a. mixing the hydrocarbon feedstock with 0.02 – 0.1 standard cubic meter hydrogen per kilogram of hydrocarbon feedstock;
    b. subjecting this mixture to desulfurization;
    c. mixing the desulfurized mixture with superheated process steam in a ratio of 1.1 – 1.7 moles per mole of carbon in the feedstock;
    d. reacting the resulting mixture from (c) in contact with a catalyst containing 35 – 70 percent by weight of nickel in a reaction zone at temperatures of 300° – 500° C and at a pressure of 10 – 20 kilograms per square centimeter to produce a high methane rich gas;
    e. reducing the pressure of said rich gas by an amount of 4 – 12 kilograms per square centimeter and reacting said rich gas in a tubular heating zone in contact with an indirectly heated catalyst containing 10 – 30 percent by weight of nickel at a temperature in the range of 850° – 980° C to produce a product gas which is rich in carbon monoxide and hydrogen;
    f. cooling said product gas and removing carbon dioxide and water vapor therefrom; and
    g. separating carbon monoxide from said cooled product gas by condensation of carbon monoxide.

2. Process of claim 1 wherein hydrogen from step (g) is recycled and mixed with the hydrocarbon feedstock in step (a).

3. Process of claim 1 wherein the weight ratio of steam to hydrocarbon feedstock in step (c) is between 2.1:1 and 1.8:1.

4. Process of claim 1 wherein carbon monoxide is separated in step (g) by being scrubbed with liquid methane.

5. Process of claim 1 wherein the catalyst used in step (d) is on a magnesium silicate or magnesium spinel support.

* * * * *